United States Patent Office 3,542,672
Patented Nov. 24, 1970

3,542,672
METHOD FOR DESULFURIZING GASIFORM AND LIQUID HYDROCARBONS
Pierre Lhonoré, Douai, and Jacques Quibel, Paris, France, assignors to Société Chimique de la Grande Paroisse (Azote et Produits Chimiques), Paris, France, a corporation of France
No Drawing. Continuation-in-part of application Ser. No. 480,187, Aug. 16, 1965. This application Apr. 18, 1968, Ser. No. 722,157
Claims priority, application France, Aug. 17, 1964, 985,400
Int. Cl. C10g 23/04
U.S. Cl. 208—217                            1 Claim

ABSTRACT OF THE DISCLOSURE

Gaseous and liquid hydrocarbons are desulfurized with hydrogen and steam at 250–280° C. with a catalyst containing 0.2–4% palladium supported on alumina and further characterized by the inclusion of 0.2 to 1% of either sodium or potassium incorporated in the catalyst with the palladium metal. The catalyst has a specific active surface of 30 to 150 square meters/gram. The catalyst does not require the well known regeneration with steam.

---

The present application is a continuation-in-part of our copending application Ser. No. 480,187 filed on Aug. 16, 1965 and now abandoned.

Our invention has for its object the desulfurizing of gasiform and liquid hydrocarbons by hydrogenating the organic sulfur contained in such hydrocarbons to form $H_2S$. Nowadays, this result is obtained by treating the hydrocarbons at a comparatively high temperature with hydrogen acting in the presence of catalysts of the cobalt molybdenum type. The hydrogen sulfide formed is then absorbed for instance by an iron mass at a temperature ranging between 150 and 300° C. or else by an absorbent containing zinc oxide at about 300 to 400° C.

Such prior methods are however not entirely satisfactory since the catalysts used show a number of drawbacks, in particular as follows:

The temperature of reaction required for obtaining a good yield, in other words that which is necessary for the hydrogenation of 90 to 99% of the sulfur should be high and consequently carbon deposits are often formed and a number of hydrocarbons may be polymerized in the presence of the catalyst. Thus, with a light naphtha having as a formula $C_{6-17}$, $A_{14-20}$ for instance boiling between 40 and 100° C. or thereabouts and containing about 25 parts per million of organic sulfur by weight, it is necessary to operate at a temperature near 400° C.

There is a tendency towards the formation of carbon and polymers even at lower temperatures.

The volumetric speed of flow over the catalyst is reduced and should generally range between 300 and 500 when it is desired to obtain a good hydrogenation of the sulfur.

Our invention has for its object to remove the abovementioned drawbacks.

To this end, it consists in using as a catalyst no longer to those resorted to hitherto, but to a palladium catalyst which is, surprisingly and contrary to what would be expected by no means poisoned by sulfur. Said catalyst may be constituted for instance by gamma alumina, the surface of which is impregnated with palladium at a rate of about 5/1000. Of course, said composition is not to be construed as limiting our invention and the catalyst may be formed in granules or pellets of a diameter of a few millimeters or be in the shape of cylinders, the depth of impregnation being equal to about 1 mm.

With such a catalyst, the volumetric speed of flow of the gases for the execution of the catalytic reaction may be much higher than previously and it may rise substantially above about 1000. The temperature in contradistinction may be substantially lower than that used hitherto and range for instance between 200 and 300° C. It has been found that for instance for a space velocity of 2500 times the volume of catalyst, the optimum temperature was 280° C. This corresponds to the highest amount of hydrogenation and to a poisoning which is practically reduced to 0.

The pressure may vary within very broad limits between atmospheric pressure and a pressure which may exceed 30 bars. Lastly, the hydrogen contents may also vary within wide limits and the molar ratio $H_2$/naphtha may range for instance between 1 and 1/10.

The invention consists thus in resorting to catalysts showing a high activity while being sufficiently hard and compact for it to be possible to use them as well as a fluid layer and as a stationary layer. Furthermore, the palladium forming the active material is distributed in a manner such that it remains non-sensitive to the sulfurous components of the reaction gases. To this end, it is necessary to incorporate 0.2 to 1% of sodium or potassium with the palladium. The specific active surface of the catalyst ranges between 30 and 150 sq. m./gram. The palladium is obtained through precipitation onto a support at the rate of 0.2 to 4% by weight of palladium with reference to the total weight of catalyst. The palladium may extend over the outer surface of the support to form a catalyst layer of a maximum thickness of 1 mm. or else the catalyst may be incorporated within the bulk of the support. The latter procedure provides a greater stability for the palladium and allows improving its activity.

A few examples of catalytic compositions are given herein below:

(1)

| | Percent |
|---|---|
| Pd | 0.2 |
| $SiO_2$ | 17.8 |
| $Al_2O_3$ | 72.6 |
| $Na_2O$ | 9.4 |

(2)

| | Percent |
|---|---|
| Pd | 4 |
| $SiO_2$ | 17 |
| $Al_2O_3$ | 69 |
| $Na_2O$ | 9 |

(3)

| | Percent |
|---|---|
| Pd | 0.4 |
| $Al_2O_3$ | 99.4 |
| $Na_2O$ | 0.2 |

EXAMPLE 1

A diluted mixture of palladium chloride containing 0.2% of palladium with reference to the totality of the catalyst is intimately mixed with 99.8% of sodium silicoaluminate which has been prepared independently, the proportions being 17.8% of $SiO_2$, 72.8% of $Al_2O_3$ and 9.2% of $Na_2O$. The product is allowed to stand for 4 hours. The palladium is precipitated by pouring onto said product under continuous stirring conditions a solution of sodium carbonate at 25% concentration. The mixture is left to stand for about 20 hours after which it is washed until a pH of about 8 is obtained. The drying is performed at 120° C. and there is finally obtained a pulverulent product the specific active area measured in accordance with the BET method is equal to 40 to 140 sq. m./gram. The powder thus obtained shows physical properties which further the production of catalytic pellets through compression.

EXAMPLE 2

The manufacturing procedure is the same as for Example 1. However, the diluted solution of palladium chloride contains 0.4% by weight of the total weight of catalyst, the sodium silicoaluminate forming the remaining 99.6%.

EXAMPLE 3

A diluted mixture of palladium chloride carrying 0.4% by weight of palladium with reference to the total weight of the catalyst is intimately admixed with 99.4% of alumina the specific active area of which ranges between 40 and 200 sq. m./gram. The mixture is allowed to stand during four hours after which the palladium is precipitated by pouring onto the mixture under permanent stirring conditions a solution of sodium carbonate at a 25% concentration. The product is left to stand again for about 10 hours and is washed so as to obtain a pH equal to 7.5. It is dried at 120° C. and finally impregnated with a solution of NaOH containing 0.2% of Na calculated as $Na_2O$. After a further drying at 120° C., the product is given the desired shape and serves for fluidization.

It should be mentioned that the catalyst is not aged after a protracted life through combination with the sulfur. The catalyst need not be regenerated in accordance with well-known methods, for instance by treatment with a stream of superheated steam.

Hereinafter are given the results of a number of tests executed so as to show the conditions of practical execution of the invention.

In the first tables are shown the rates of hydrogenation for a gasoline containing 25 parts per million of sulfur by weight and to which is added 1 mole of hydrogen and 1 mole of steam per mole of gasoline. The volumetric speed considered is reckoned for the total mixture entering into reaction in kgs./hour at a temperature of 0° C. and under a pressure of 760 mm. of mercury with reference to each cubic meter of catalyst. The tests were made on the one hand at a pressure approximately atmospheric pressure and on the other hand under a pressure of 25 bars for each of the following volumetric speeds: 1000—2000—3000 and 4000. The tables show the rate of organic sulfur transformed into hydrogen sulfide and the rate of sulfur passing out of the catalyst, at a temperature of about 280° C.

TABLE 1

| Volumetric speed | Percentage of hydrogenated sulfur | | Percentage of sulfur passing out of the catalyst as $H_2S$ | |
|---|---|---|---|---|
| | Atmospheric pressure | 25 bars | Atmospheric pressure | 25 bars |
| 1,000 | 95 | 90 | 95 | 90 |
| 2,000 | 90 | 85 | 90 | 85 |
| 3,000 | 80 | 85 | 80 | 85 |
| 4,000 | 65 | 75 | 65 | 70 |

It is found that the catalyst gives back all the sulfur it contains in the case of a very long duration of operation. For a volumetric speed of 2000, the gasoline contains atfer hydrogenation only 2.5 parts per million of organic sulfur under atmospheric pressure and 3.4 parts per million under a pressure of 25 bars.

The following Table 2 shows the influence of temperature on the rate of sulfur adsorbed by the catalyst without being given back by the latter, and producing a poisoning of the palladium. Said table corresponds to tests executed under atmospheric pressure with a constant volumetric speed of 2500 at different temperatures.

TABLE 2

| Temperature | Percentage of hydrogenated sulfur | Percentage of sulfur passing out of the catalyst |
|---|---|---|
| 210° C | 50 | 20 |
| 235° C | 50 | 40 |
| 260° C | 70 | 65 |
| 280° C | 85 | 85 |
| 295° C | 70 | 60 |
| 305° C | 60 | 40 |

It is apparent that the optimum temperature for said volumetric speed is about 280° C. as already mentioned. It corresponds to the highest rate of hydrogenation and to a poisoning reduced practically to zero.

The following Table 3 shows the influence of pressure on the hydrogenation and the desorption of hydrogen sulfide. It shows for the different pressures and for each temperature the percentage of hydrogenated sulfur and underneath the figure giving said percentage the percentage of sulfur passing out of the catalyst as hydrogen sulfide, the conditions of experimentation being furthermore the same as in the previously disclosed cases.

TABLE 3

| Temperature | Pressure in bars | | |
|---|---|---|---|
| | 1 | 14 | 30 |
| 210° C | 50 | 65 | 75 |
| | 20 | 50 | 65 |
| 235° C | 50 | 80 | 80 |
| | 40 | 70 | 80 |
| 260° C | 70 | 85 | 85 |
| | 65 | 80 | 85 |
| 280° C | 85 | 85 | 85 |
| | 85 | 85 | 85 |
| 295° C | 70 | 70 | |
| | 60 | 45 | |
| 305° C | 60 | | |
| | 40 | | |

It is apparent for instance that for a volumetric speed of 2500, the best results are obtained under pressures ranging between 15 and 30 bars associated with temperatures of about 270° C., which leads to very reduced poisoning. Said tables show also that the range of temperatures for which the catalyst can be used is large.

The hydrogen contents have also a substantial influence on the reaction and the following Table 4 shows for a volumetric speed of about 1250 the results of hydrogenation obtained with 1 mole of steam for each mole of gasoline under a pressure of 14 bars and for different temperatures and molecular ratios between hydrogen and gasoline. The first figure given is the percentage of hydrogenated sulfur and the figure recorded underneath said first figure is the percentage of sulfur leaving the catalyst as hydrogen sulfide.

TABLE 4

| Temperature | Molar ratio $H_2$/gasoline | | | |
|---|---|---|---|---|
| | 1 | 1/2 | 1/4 | 1/10 |
| 235° C | 80 | 50 | 35 | 10 |
| | 70 | 30 | 15 | 10 |
| 260° C | 85 | 60 | 40 | |
| | 80 | 35 | 15 | |
| 280° C | 85 | 80 | 50 | |
| | 85 | 50 | 20 | |

The presence or absence of steam has also an influence on the hydrogenation and on the desorption of sulfur. The presence of steam increases the rate of hydrogenation and the rate of sulfur passing out of the catalyst. The following table shows for various volumetric speeds under atmospheric pressure and for a temperature of operation of 280° C. and a ratio $H_2$/naphtha corresponding to an equimolar relationship the rates of hydrogenation and of sulfur passing out of the catalyst on the one hand when operating with 1 mole of steam and on the other hand when the operation is executed without steam.

TABLE 5

| Volumetric speed | With 1 mole of steam | Without steam |
|---|---|---|
| 1,000 | 95 / 95 | 92 / 85 |
| 2,000 | 90 / 90 | 85 / 70 |
| 3,000 | 80 / 80 | 70 / 50 |
| 4,000 | 65 / 65 | 50 / 30 |

The above table shows that it is possible under some conditions of reaction to observe a more or less considerable ageing of the catalyst through a combination of the sulfur therewith; as already mentioned, said catalyst may then be regenerated in the manner already referred to.

We will now disclose a practical procedure of desulfurisation executed in accordance with our invention.

The object of the test was to desulfurise for further reforming 1635 kgs./hour of light naphtha having as a mean condensed formula $C_{6-17}$, $H_{14-20}$ (range 40 to 110° C.) and containing 5% of nonsaturated hydrocarbons, 20 to 50 parts per million of organic sulfur and 3.5% of aromatic hydrocarbons.

We added to the vaporized naphtha at about 350° C. hydrogen incorporated with a mixture of N and H used for the synthesis of ammonia at the rate of 550 cubic meters/hour together with 320 kgs./hour of superheated steam. The homogeneous mixture enters at 275° C. with the catalyst under a pressure of about 25 bars. It passes then over activated zinc oxide. The content of sulfur in the reaction was about 2 to 3 parts per million by weight of the naphtha assumed to be condensed. The volume of the load of the palladium catalyst was equal to 0.5 cubic meters and that of the zinc oxide to 8 cubic meters. The plant operated with less than 3 parts of sulfur per million in the output during several months, without it being necessary to regenerate the palladium catalyst.

In brief the gist of the invention lies in the new possibility of using palladium as a catalyst when treating sulfur-containing hydrocarbon at a temperature substantially lower than hitherto.

The following tables show a lowering of the operative temperature which requires a reduced amount of heat insulation and the use of cheaper material for the reaction vessel while no polymerization of hydrocarbons is to be feared, no regeneration of the palladium catalyst is re-required, no carbon black is formed and a higher volumetric speed is possible together with an excellent yield.

INFLUENCE OF THE COMPOSITION OF SULFUR CONTAINING DERIVATIVES ON THE DISTILLATION CURVE OF THE TREATED NAPHTHA (ASTM)

[Pressure 30 bars or atm., Recycling gas $N_2+3H_2$]

| Naphtha | | | Catalyst | $H_2$/naphtha | Volumetric speed | Catalyst temperature, ° C. | S, output (p.p.m.) | Pressure |
|---|---|---|---|---|---|---|---|---|
| PI | PF | S, p.p.m. | | | | | | |
| 25 | 125 | 24 | 1 | 0.5 | 2,000 | 290 | 4.9 | Atm. |
| 25 | 125 | 24 | 2 | 0.4 | 2,000 | 290 | 4.7 | 30 bars. |
| 25 | 125 | 24 | 3 | 0.4 | 5,000 | 290 | 3.0 | 30 bars. |
| 25 | 125 | 24 | 4 | 0.1 | 2,000 | 290 | 5.0 | Atm. |
| 25 | 125 | 300 | 2 | 0.4 | 2,000 | 290 | 4.9 | Atm.[1] |
| 25 | 125 | 300 | 3 | 0.4 | 5,000 | 290 | 3.5 | Atm.[1] |
| 25 | 125 | 300 | 4 | 0.1 | 2,000 | 290 | 5.0 | Atm.[1] |
| 40 | 170 | 68 | 2 | 0.4 | 2,000 | 290 | 4.1 | 30 bars. |
| 40 | 170 | 68 | 3 | 0.4 | 5,000 | 290 | 3.2 | Atm. |
| 40 | 170 | 68 | 4 | 0.1 | 2,000 | 290 | 4.7 | Atm. |
| 40 | 170 | 68 | 2 | 0.4 | 2,000 | 290 | 2.1 | 30 bars.[1] |
| 60 | 220 | 164 | 2 | 0.4 | 2,000 | 320 | 16.5 | Atm. |
| 60 | 220 | 164 | 3 | 0.4 | 5,000 | 320 | 11.2 | Atm. |
| 60 | 220 | 164 | 4 | 0.4 | 2,000 | 320 | 8.4 | Atm.[2] |

[1] Enriched with S and hexanothiol.  [2] 1 mol $H_2O$/mol naphtha.

INFLUENCE OF THE HYDROGEN RATIO

[Light naptha formula $C_{5.5}$ $H_{13}$—Pressure 30 bars—10 litres of catalyst—0.5% palladium on alumina surface—No steam]

| Temperature of the catalyst | | Naphtha | | Recycling gas | | | Volumetric speed | S, output (p.p.m.) |
|---|---|---|---|---|---|---|---|---|
| Input, ° C. | Output, ° C. | Throughput in l./h. | S weight, p.p.m. | Nature | Throughput in cu. m./hr. | $H_2$/naphtha in molecules | | |
| 280 | 280 | 50 | 18 | $H_2$ | 9.3 | 1.0 | 1,860 | 1.8 |
| 290 | 280 | 60 | 18 | $H_2$ | 11.0 | 0.98 | 2,200 | 2.5 |
| 290 | 280 | 50 | 18 | $H_2+3H_2$ | 12.5 | 1.0 | 2,150 | 2.0 |
| 280 | 280 | 50 | 18 | $H_2+3H_2$ | 10.0 | 0.81 | 1,950 | 1.8 |
| 280 | 290 | 60 | 18 | $H_2+3H_2$ | 10.0 | 0.67 | 2,250 | 2.2 |
| 290 | 290 | 60 | 18 | $H_2+3H_2$ | 8.8 | 0.58 | 2,000 | 1.9 |
| 280 | 290 | 60 | 24 | $H_2+3H_2$ | 8.8 | 0.58 | 2,000 | 2.0 |
| 280 | 290 | 66 | 24 | $H_2+3H_2$ | 8.8 | 0.53 | 2,110 | 2.0 |
| 290 | 300 | 60 | 24 | $H_2+3H_2$ | 6.0 | 0.40 | 1,720 | 3.1 |
| 290 | 290 | 60 | 34 | $H_2+3H_2$ | 6.0 | 0.40 | 1,720 | 2.9 |
| 290 | 280 | 60 | 68 | $H_2+3H_2$ | 6.0 | 0.40 | 1,720 | 3.8 |
| 270 | 290 | 50 | 24 | Furnace gas | 15.6 | 1.0 | 2,500 | 3.2 |
| 280 | 300 | 50 | 24 | do | 12.5 | 0.57 | 2,200 | 3.5 |
| 280 | 290 | 60 | 24 | do | 8.8 | 0.47 | 2,000 | 4.2 |
| 285 | 295 | 60 | 34 | do | 8.8 | 0.47 | 2,000 | 4.2 |
| 285 | 295 | 60 | 68 | do | 8.8 | 0.47 | 2,000 | 4.5 |

Composition of the furnace gas, mg./cu. m.:

| | |
|---|---|
| $CO_2$ | 1.8 |
| CO | 4.6 |
| $H_2$ | 60 |
| $CH_4$ | 22.6 |
| $C_2H_6$ | 1.4 |
| $C_2H_4$ | 1.8 |
| $O_2$ | 0.7 |
| $N_2$ | 7.6 |
| S | 40 |

INFLUENCE OF THE PALLADIUM CONTENTS

Four catalysts have been examined under atmospheric pressure for C5.5. H13 naphtha
Catalyst I 0.3% of palladium on alumina surface, recycling $H_2$ gas
Catalyst II 0.5% of palladium on alumina surface, recycling $H_2$ gas
Catalyst III 1.6% of palladium impregnated within the alumina mass
Catalyst IV 0.5% of palladium impregnated within the alumina mass

| Temperature of the catalyst °C. | $H_2$/naphtha in molecules | S at the input (p.p.m.) | Catalyst I Volumetric speed | Catalyst I S, input (p.p.m.) | Catalyst II Volumetric speed | Catalyst II S, input (p.p.m.) | Catalyst III Volumetric speed | Catalyst III S, input (p.p.m.) | Catalyst IV Volumetric speed | Catalyst IV S, input (p.p.m.) |
|---|---|---|---|---|---|---|---|---|---|---|
| 290 | 1.0 | 24 | 2,000 | 3.2 | 2,000 | 2.0 | 4,000 | 1.6 | 2,000 | 1.7 |
| 260 | 1.0 | 24 | | | | | 7,500 | 6.0 | | |
| 290 | 0.8 | 24 | 2,000 | 3.5 | 2,000 | 1.9 | 4,500 | 1.6 | 2,500 | [1]1.7 |
| 290 | 0.7 | 24 | 1,800 | 3.2 | 2,000 | 2.1 | 5,000 | 2.0 | 2,500 | 1.9 |
| 290 | 0.6 | 24 | 1,800 | 3.7 | 2,000 | 2.3 | 5,000 | 2.1 | 3,000 | 3.2 |
| 290 | 0.5 | 24 | 1,800 | 3.9 | 2,000 | 3.3 | 5,000 | 2.3 | 2,500 | 2.2 |
| 300 | 0.5 | 245 | | | | | | | 2,500 | 2.0 |
| 240 | 0.4 | 24 | 1,800 | 4.9 | 2,000 | 4.7 | 5,000 | 2.9 | 2,500 | 3.7 |
| 330 | 0.4 | 24 | 1,800 | 6.0 | 2,000 | 4.9 | 5,000 | 3.0 | 2,500 | 3.9 |
| 400 | 0.4 | 24 | 1,800 | 6.3 | 1,500 | 5.0 | 5,000 | 3.2 | 2,000 | 4.0 |
| 280 | 0.3 | 24 | | | | | | | 4,500 | 5.0 |
| 285 | 0.2 | 24 | | | | | | | 2,300 | 5.0 |
| 298 | 0.1 | 24 | | | | | | | 2,000 | 5.0 |
| 300 | 1.0 | 300 | 1,500 | 2.5 | | | | | | |
| 300 | 0.75 | 300 | 1,500 | 8.0 | | | | | | |

[1] 1 mol $H_2O$/mol naphtha.

INFLUENCE OF THE PRESSURE

[Naphtha C5.5 H13—Recycling gas $N_2+3H_2$—Catalyst 0.5% of palladium—No steam]

| Pressure | S, p.p.m. | $H_2$/Naphtha | Volumetric speed | Temperature catalyst, °C. | S, output (p.p.m.) |
|---|---|---|---|---|---|
| 10 | 24 | 1.0 | 2,000 | 290 | 2.2 |
| 30 | 24 | 0.5 | 2,000 | 290 | 2.0 |
| 45 | 24 | 0.3 | 2,000 | 290 | 2.0 |
| 60 | 24 | 0.3 | 2,000 | 290 | 5.2 |
| 60 | 24 | 0.3 | 2,000 | 322 | 2.2 |
| 100 | 24 | 0.2 | 2,000 | 347 | 2.2 |
| 100 | 24 | 0.2 | 2,000 | 330 | 2.7 |
| 100 | 24 | 0.2 | 2,000 | 300 | 3.9 |
| 100 | 24 | 0.2 | 2,000 | 290 | 4.7 |
| 100 | 68 | 0.2 | 2,000 | 290 | 7.3 |
| 100 | 68 | 0.2 | 2,000 | 300 | 5.0 |

What we claim is:

1. A method for the catalytic desulfurization of hydrocarbons containing organic sulfur, comprising contacting such hydrocarbons in fluid phase with hydrogen and steam at a temperature of 250 to 280° C. in the presence of a catalyst containing 0.2 to 4% by weight palladium supported on a carrier consisting essentially of alumina, the catalyst having 0.2 to 1% by weight of a member selected from the group consisting of sodium and potassium incorporated with the palladium, said catalyst having a specific active surface of 30 to 150 square meters per gram.

References Cited

UNITED STATES PATENTS

| | | | |
|---|---|---|---|
| 2,885,352 | 5/1959 | Ciapetta et al. | 208—217 |
| 2,890,165 | 6/1959 | Bednars et al. | 208—217 |
| 3,161,605 | 12/1964 | Beck et al. | 252—460 |
| 3,169,107 | 2/1965 | Coonradt et al. | 252—460 |
| 3,373,110 | 3/1968 | Chen | 252—460 |
| 3,112,257 | 11/1963 | Douwes et al. | 208—216 |
| 3,116,234 | 12/1963 | Douwes et al. | 208—216 |
| 3,173,853 | 3/1965 | Peralta | 208—216 |
| 3,453,206 | 7/1969 | Gatsis | 208—210 |

FOREIGN PATENTS

| | | |
|---|---|---|
| 120,551 | 9/1919 | Great Britain. |
| 715,739 | 9/1954 | Great Britain. |

DELBERT E. GANTZ, Primary Examiner

G. J. CRASANAKIS, Assistant Examiner